Figure 1:
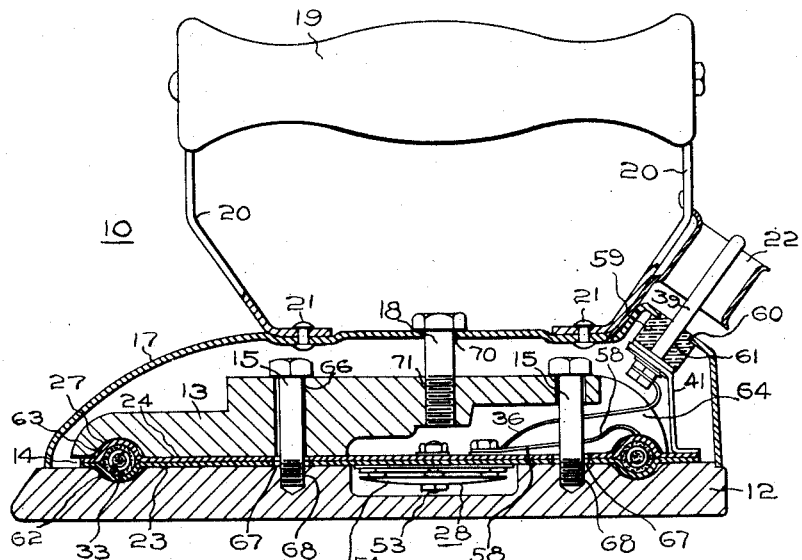

June 17, 1930.  C. C. HARPSTER  1,764,301
HEATING UNIT
Filed July 27, 1926

WITNESSES:
R. S. Harrison
A. P. Greene

INVENTOR
Clyde C. Harpster
BY Wesley G. Carr
ATTORNEY

Patented June 17, 1930

1,764,301

UNITED STATES PATENT OFFICE

CLYDE C. HARPSTER, OF MANSFIELD, OHIO, ASSIGNOR TO WESTINGHOUSE ELECTRIC & MANUFACTURING COMPANY, A CORPORATION OF PENNSYLVANIA

HEATING UNIT

Application filed July 27, 1926. Serial No. 125,135.

My invention relates to heating units and particularly to electric heating units for sad irons.

An object of my invention is to provide a simple and efficient heating unit that may be manufactured at a relatively low cost.

Another object of my invention is to provide effective means for conducting heat from a heating unit to the place of application.

Another object of my invention is to provide a thermostatic circuit controlling device in a heating unit.

Another object of my invention is to provide an improved electric heating unit for a sad iron or similar device.

Other objects will be apparent from the disclosure.

In the present embodiment of my invention, the heating unit comprises a sheet-metal structure provided with grooves or recesses defining a chamber having perforated walls and an electric heating coil therein. The heating coil is insulated from the walls of the chamber, the insulation being preferably provided by inserting an initially metallic material, such as magnesium, in said chamber and introducing an oxidizing medium through the perforations of the chamber walls for expansively oxidizing said material. In order to protect the magnesium oxide from being broken and escaping from the chamber, suitable closure members, preferably resilient, which may be integral with the sheet metal structure, are provided for automatically closing said perforations when the heating unit is placed in operative position with respect to a heat-consuming body, such as the sole plate of an electric iron. Obviously, the perforations may be closed before the heating unit is placed in position if necessary.

Suitable means, such as a thermostatic switch, for controlling the energization of the heating coil is provided.

Figure 2:
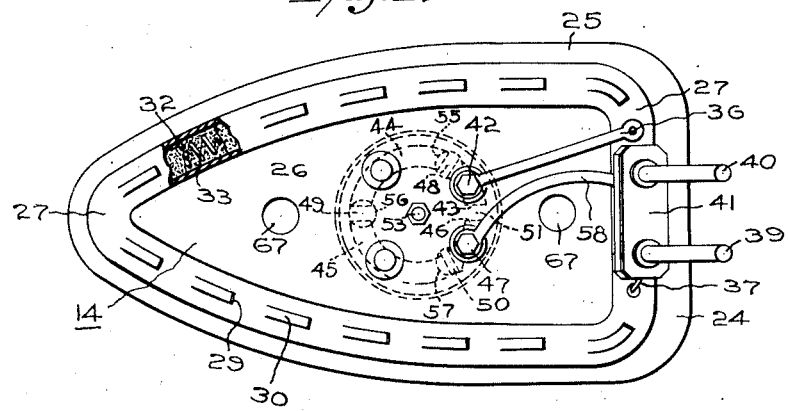
Figure 3:
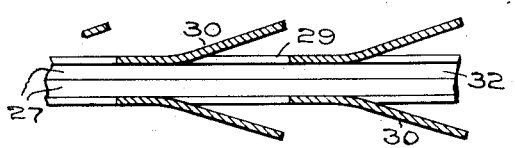
Figure 4:
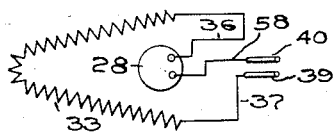

In the drawing,

Fig. 1 is a longitudinal sectional view showing a sad iron having one form of my improved heating unit incorporated therein, Fig. 2 is a top plan view of my improved heating unit, a portion of the heating chamber walls being cut away to show the heating coil embedded in the insulating material, Fig. 3 is a detail view showing a partial longitudinal section of the heating chamber and Fig. 4 is a diagrammatic view showing the electric circuit of the heating unit.

Referring to the drawings, the sad iron 10 shown in Fig. 1 comprises, in general, a sole plate 12, a clamping plate 13 having the heating unit 14 positioned therebetween. The clamping plate is secured to the sole plate by any suitable means, such as studs 15.

A suitable casing 17 rests on the sole plate 12 and is secured in proper position by means of a stud 18 which is screw threaded into the clamping plate 13. A handle 19 is provided which is herein shown as mounted on the casing by means of brackets 20, the lower ends of whch are fastened to the casing by means of rivets 21. A suitable plug guide 22 is provided which is secured to the casing by any desired means. The details of the casing and handle construction constitute no part of the present invention.

The heating unit 14 comprises, in the present embodiment of my invention, a pair of similarly-shaped oppositely-disposed sheet-metal plates or elements 23 and 24, preferably having the same general outline as a finished iron. Each of these elements has an edge portion 25, a central portion 26, and a groove portion 27 between the portions 25 and 26.

A series of perforations 29 are cut in the groove portion 27. The metal displaced in forming these perforations is struck out, but not entirely severed, from the plate. These struck-out portions 30 form tongues positioned at an angle with respect to the groove 27, and are utilized as closure members for the perforations 29, in a manner that will be hereinafter clearly described.

The plates 23 and 24 are placed together with their respective groove portions 27 registering and oppositely disposed, so as to form a continuous chamber 32. An electric heating element, such as a resistance coil 33, surrounded by an initially metallic expansively oxidizable material such as magnesium, is inserted in the chamber 32. This heating coil preferably extends entirely around the chamber 32. The plates 23 and 24 are then permanently secured together in any desired way, as by welding.

Conductors 36 and 37 are connected to the ends of the heating coil 33. Terminal posts 39 and 40, insulatedly mounted on the terminal support 41 that is secured by suitable means, such as riveting, to the heating unit 14, are provided.

The conductor 37 is electrically connected at its other end to the terminal post 39. The conductor 36 is connected to a terminal post 42, that in turn, is electrically connected to a stationary contact member 43 of a thermostatic switch 28.

The thermostatic switch comprises the terminal post 42, the stationary contact member 43, and the stationary contact members 44, 45 and 46. The stationary contact member 46 is connected to the terminal post 47. The contact member 43 is separated from the contact member 44 by an air gap 48, the contact member 44 is separated from the contact member 45 by an air gap 49, the contact member 45 is separated from the contact member 46 by an air gap 50, and the contact member 46 is separated from the contact member 42 by an air gap 51.

The contact members 43, 44, 45 and 46 are rigidly secured to the central portion 26 of the heating unit 14 by any desired means, such as by rivets. The central portion 26 of the heating unit thus serves as the base member of the thermostatic switch, thereby eliminating a part and simplifying the construction. Suitable insulation may be provided to insulate these contact members from the heating unit 14.

A stud 53, mounted on the heating unit 14 centrally of the stationary contact members, forms a convenient means for securing a bimetallic thermostatic disc 54 in spaced relation to the heating unit 14. The thermostat illustrated, is of the type disclosed in patent to Spencer, No. 1,448,240, patented March 13, 1923. Bridging contact members 55, 56, and 57, mounted on the thermostat, register, respectively, with the air gaps 48, 49 and 50 and are adapted to electrically connect corresponding stationary contact members. When the heating unit is used in an electric iron, as illustrated in Fig. 1, the bridging contact members will normally engage the stationary contact members and electrically connect them.

The terminal post 47 is electrically connected to the terminal post 40 by means of a conductor 58. The electrical circuit is most clearly shown in Fig. 4.

Referring to Fig. 4, the path of the current will be as follows: Assuming that the current enters by way of the terminal post 40, current will flow from a main conductor (not shown) through the terminal post 40, the conductor 58, the thermostatic switch 28, the conductor 36, the heating coil 33, the conductor 37 and the terminal post 39 to the other main conductor (not shown).

An insulating bushing 59, secured to the casing 17 in an opening 60, has holes 61 which are adapted to so receive the terminal posts 39 and 40 as to insulate the terminal post from the casing 17. In order to provide proper insulation for the coil 33, the magnesium element above-mentioned is expansively oxidized in any suitable manner, as by treating it with steam, under pressure, or other oxidizing substance. After thus being expansively oxidized, the initially metallic magnesium surrounding the coil 33 will be changed to an electric-insulating oxide of magnesium that entirely fills the chamber 32 and surrounds the coil 33, thus insulating the coil from the heating unit in situ.

In the specific illustration of the invention shown in the drawing, the perforations 29 in the plates 23 and 24 are located directly opposite each other; however, it is to be understood that the openings may be staggered relative to each other. Since the openings are positioned end to end, it is apparent that the sections of magnesium metal between the openings will be subjected to the oxidizing action of the steam from both ends, thus insuring that a complete conversion of magnesium metal to magnesium oxide will take place.

Continuous recesses 62 and 63 are provided in the sole plate and clamping plate, respectively, of the sad iron. These recesses are shaped similarly to the groove portions 27 of the heating unit and are of such dimensions that they are adapted to receive such groove portions when the heating unit is placed between the clamping plate and the sole plate and to permit the flat portions of the heating unit to contact with the clamping plate and the sole plate. The recess 63 connects at the rear of the clamping plate with a cut away portion 64 that permits the conductors 36 and 58 to be received therein.

In assembling the sad iron, the heating unit 14 will be placed on the sole plate 12 with the bottom groove portion 27 of the heating unit fitting in the recess portion 62 of the sole plate. The clamping member 13 is then placed on the heating unit so that the recess 63 of the clamping plate will receive the top groove portion 27 of the heating unit, and the cut out portion 64 of the clamping plate will receive the terminal support 41. The threaded studs 15 are then passed through the holes 66 in the clamping plate and the holes 67 in the heating unit, and are screwed into the tapped holes 68 of the sole plate.

When the threaded studs 15 are tightened, the clamping plate 13 and the sole plate 12 will be drawn together to snugly engage the heating unit 14, thus providing good thermal contact between the clamping plate, the sole plate and the heating unit. At the same time, the tongues 30 at the top and bottom of the chamber 32 will be engaged at their free ends by the walls of the recesses 62 and 63 and will be forced towards the heating chamber and will close the perforations 29. The perforations having been closed, the magnesium oxide is protected against breakage and prevents particles of oxide, when broken, from escaping from the heating unit so as to expose the resistance element 33.

Since the tongues or closure members 30 are more or less resilient, they will bear against the walls of the recesses 62 and 63 and thus insure a good thermal connection between the walls of the heating chamber 32 and the walls of the recesses 62 and 63 and will thus provide a good thermal connection between the heating chamber and the sole plate and clamping plate. With this construction, reasonable tolerances may be allowed in constructing the sole plate and the clamping plate, and yet insure a good thermal connection between the heating unit and the plates.

While it has been previously stated herein that the tongue portions 30 may be forced automatically into the openings or perforations 29 by clamping the heating unit between the sole plate 12 and the clamping plate 13 by means of the studs 15, it is to be understood that the perforations 29 may be closed by other means and before the heating unit 14 has been assembled in the sad iron or other device to which it may be applied.

After the clamping plate, heating unit and the sole plate are secured together, the casing member 17 may be attached by slipping the terminal posts 39 and 40 through the holes 61 of the bushing 59 and inserting the stud 18 through the opening of the casing 70 for engaging a tapped hole 71 in the clamping plate 63. The stud 18 is tightened to clamp the casing 17 to the sole plate 12.

When the sad iron 10 is in use, it is connected to a source of current by a conductor (not shown) having a plug that is inserted in the guide 22 and engages the terminal posts 39 and 40.

Since, as before stated, the thermostat 54 will be normally in the position shown in Fig. 1, the bridging contact members will normally engage the stationary contact members and complete a circuit through the thermostatic switch. Therefore, a current will normally flow through the terminal posts 39 and 40, the thermostatic switch 28 and the resistance coil 33. This will heat the resistance coil 33 and of course, the sad iron.

When the sad iron has been heated to a suitable predetermined temperature, the thermostat 54 will suddenly curve in a direction opposite to that shown in Fig. 1 and the bridging contact members will thus be quickly disengaged from the stationary contact members, thus breaking the current through the thermostatic switch and, the resistance coil 33. The sad iron may thus be maintained at a substantially uniform temperature suitable for its operation.

While I have shown and described for purposes of illustration, a particular form of my invention, it may, of course, be embodied in other forms without departing from the spirit and scope thereof as set forth in the appended claims.

I claim as my invention:

1. The method of making sheathed electrically-insulated heating units which consists in placing a resistor between a pair of metallic plates, each provided with integral struck-out portions, spacing the resistor from the plates with metallic magnesium, subjecting the magnesium metal to an oxidizing agent to convert it to magnesium oxide and then forcing the struck-out portions into the openings to close them after the magnesium metal has been converted to the oxide of magnesium.

2. The method of making a sheathed, electrically insulated heating unit comprising a pair of metal plates having grooves therein and having also struck-out portions in the walls of the grooves, a resistor located in the groove, and means for insulating the resistor from the plates, which consists in inserting the resistor in a sheath of metallic magnesium, inserting the sheathed resistor in the grooves, securing the plates together, subjecting the magnesium metal to an oxidizing agent to convert it to magnesium oxide, and then closing said openings after the magnesium metal has been converted to magnesium oxide.

3. The method of making sheathed, electric heating units which comprises enclosing a resistor within a sheath of metallic magnesium, enclosing the sheath and resistor in a casing having lateral openings therein communicating with the magnesium sheath, subjecting the magnesium sheath to steam forced through the openings to convert the magnesium metal to magnesium oxide, and then stressing the casing to close the openings.

In testimony whereof, I have hereunto subscribed my name this 16th day of July 1926.

CLYDE C. HARPSTER.